Jan. 17, 1933.  J. C. MESSICK  1,894,318
AUTOMATIC VARIABLE SPEED TRANSMISSION
Filed June 19, 1931  2 Sheets-Sheet 1

Inventor,
J. C. Messick;
F. E. Maynard,
ATTORNEY.

Jan. 17, 1933. J. C. MESSICK 1,894,318
AUTOMATIC VARIABLE SPEED TRANSMISSION
Filed June 19, 1931    2 Sheets-Sheet 2

INVENTOR,
J. C. Messick;
BY F. E. Maynard,
ATTORNEY.

Patented Jan. 17, 1933

1,894,318

UNITED STATES PATENT OFFICE

JOHN C. MESSICK, OF VENICE, CALIFORNIA, ASSIGNOR OF ONE-THIRD TO FRANK H. TULL, OF CULVER, CALIFORNIA

AUTOMATIC VARIABLE SPEED TRANSMISSION

Application filed June 19, 1931. Serial No. 545,399.

This invention relates to power transmitting mechanism and especially to means for transmitting power from a prime mover to a driven element, as of an automotive vehicle.

An object is to provide a transmission involving means to procure a positive lock drive, or a "free wheeling" relation of driving and driven parts; to secure a neutral position for free motor action, and to enable a reverse turn of the driven part as to motor turn.

A further object is to provide a transmission providing for an automatic variation of speed of motor driven driver as determined by load on the driven end of the transmission. In this connection an object is to provide a load controlled coupler and hydraulic clutch between the driving motor and the ultimate driven element of the transmission whereby, when the load increases to a degree above normal motor capacity the speed of the driven part will fall off and as this happens the hydraulic clutch is designed to slip and allow the motor to speed up relative to the driven part, to equal or drive the load. In this way automatic speed control of the motor is effected to meet the load. Speed of load travel up to maximum of motor power is, in turn, controlled by motor throttle (or switch, as the case may be).

This invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1:
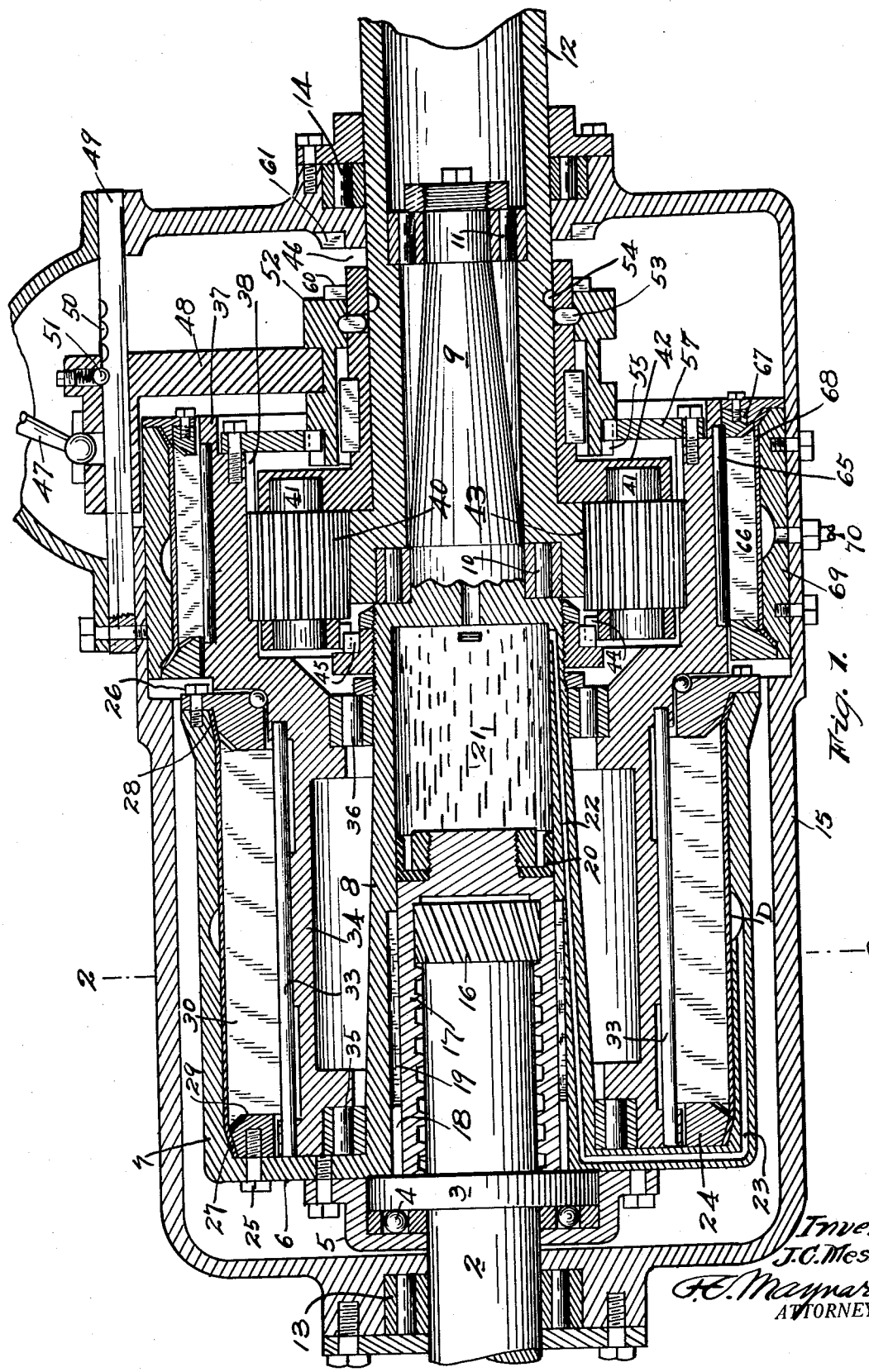
Figure 1 is an axial section of the transmission.

In its illustrated embodiment, a motor or drive shaft 2 is provided with a flange 3 flanked by an end-thrust bearing 4 in a cap 5 which is secured to the head 6 of a clutch drum 7. The drum has a central hollow, trunnion-cylinder 8 whose end is turned down and formed with a steady spindle 9 supported by bearings 10—11 in a hollow driven shaft element 12.

The shafts 2—12 are coaxial and supported in bearings 13—14 in end walls of an appropriate box 15.

The shaft 2 projects into the trunnion cylinder 8 and is provided with a helical gear or pinion 16 which is in constant mesh with a mutual internal sleeve-gear 17 which has exterior splines or keys 18 longitudinally shiftable in ways 19 along a part of the cylinder 8; the sleeve-gear being operatively fitted in this cylinder and having, at one end, a cup packing 20 facing the remote closed end of the cylinder chamber.

Thus, the initial impulse of the rotating, driving shaft 2 is to cause the sleeve-gear 17 to be pressed axially in the trunnion cylinder 8 due to the torque effort of the pinion helix 16 engaged in the sleeve 17.

The resistance of the cylinder 8 is heavy enough against the turning of the sleeve by the pinion 16 to cause the sleeve to shift along the way 19 and in so doing the piston cup 20 acts to express a fluent substance 21, contained in the cylinder, out into one or more ducts 22 in the cylinder wall and thence radially to ducts 23 provided in the cylindrical wall of the drum 7 and then inwardly against a pliable diaphragm D, such as leather, in the form of a cylinder lining the drum 7 and hermetically sealed at each end by a barrel cage 24 concentric in the drum and secured thereto by end screws 25—26. The ends of the barrel cage are so beveled at 27—28 as to securely jam the ends of the diaphragm against relative seats in the drum and thus prevent leak of the liquid 21 from the confining diaphragm.

Figure 2:
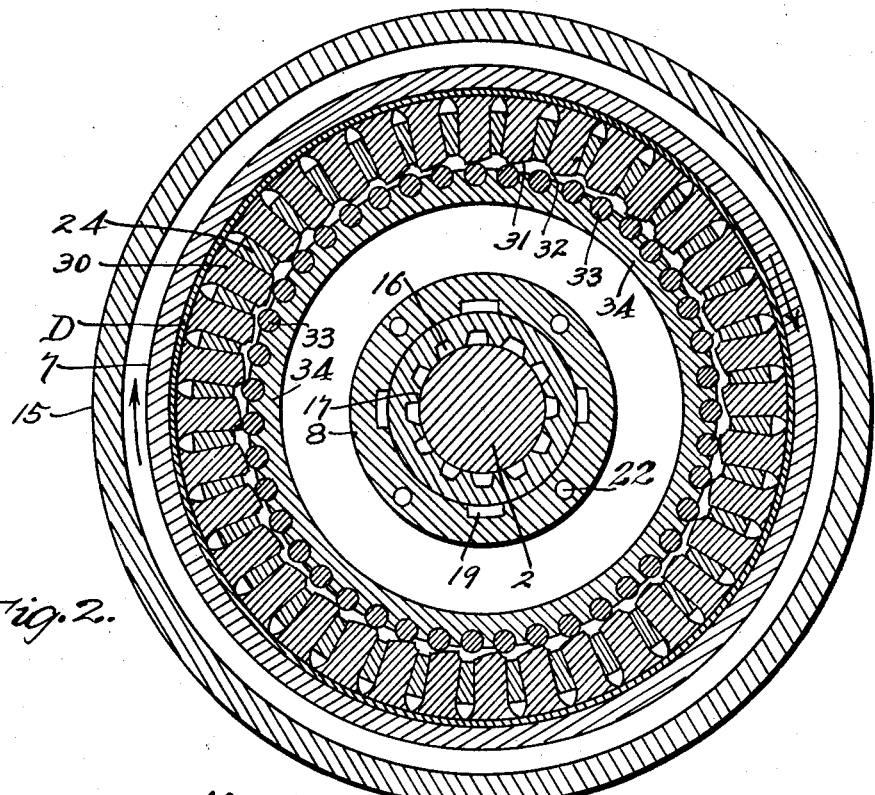
Figure 2 is a cross-section on line 2—2, of Fig. 1.

The barrel cage has a number of longitudinal slots 29 with parallel-face side walls between which are radially movable numerous free piston bars 30, one in each slot, and whose outer faces are opposed to, and engaged by, the pliable diaphragm D. The inner longitudinal faces of the bars 30 each present a beveled surface 31 ending in a ridge 32 adjacent to the back corner of the bar; that is, the corner remote as to direction of rotation of the barrel and drum structure, denoted by arrow, Figure 2.

When the independent piston bars 30 are pressed inward they severally engage against a system of free rollers 33. These rollers are journaled at their ends in an intermediate coupler device. This consists of a tubular body 34 having spaced anti-friction bearings 35—36 on the trunnion-cylinder 8, and, thus, is interposed between the trunnion and the encompassing barrel and drum assembly, which constitutes a drive unit connected by the splined sleeve 17 to the driving shaft 2 by the gear 16.

The coupler body has an enlarged end flange 37 which has an internal gear face 38 with which constantly meshes a set of planetary gears 40, having end bearings 41 in a runner 42 slidably and rotatively fitting on the driven shaft 12.

The planetary gears 40 constantly mesh with a sun gear 43 provided on the inner end of the driven shaft 12 which is supported on the bearing 10 next to the shouldered end of the cylinder 8.

The inner end of the gear carrying runner 42 has a set of spurs 44 which are designed to interlock for positive drive relation with the cylinder 8 by engagement with a complementary spur ring 45 fixed on the near end of the drive cylinder 8. The runner 42 has only enough axial shift to disengage the mutual spurs 44 and spur ring 45; this movement being indicated by the clearance 46, Fig. 1.

Shift of the runner is accomplished by a gear shift device which includes a lever 47 engaging a yoke 48 slidably mounted on a bar 49 which has a series of alined notches 50 to receive a yieldable latch 51 to temporarily secure the yoke in any of its selected positions. The yoke embraces a controller in the form of a sleeve 52 which engages a plurality of radial tumbler pins 53 lying in the runner 42 and moveable to project somewhat into a race way 54 in the shaft 12 when the runner 42 is shifted to unlock positive drive clutch spurs 44—45 (by shift of controller 52).

The controller 52 is slidably splined on the runner 42 and has its inner end provided with a ring of lock teeth 55. This ring of teeth is adapted to mesh with, and is wider than, an internal ring-gear 57 fixed to the adjacent end of the coupler body 34. The ring-gear 57 is about one-half as wide as the teeth 55 so as to be in mesh therewith when parts are all set for positive or direct drive, as shown in Fig. 1, and also when the controller is moved one step to disengage spurs 44—45 and thus obtain what is now called "free-wheeling" of the driven shaft 12. That is, this shaft can run faster than its driving coupler 34, as will be the case of a motor car on a down grade, or a suddenly shut off throttle.

Figure 3:
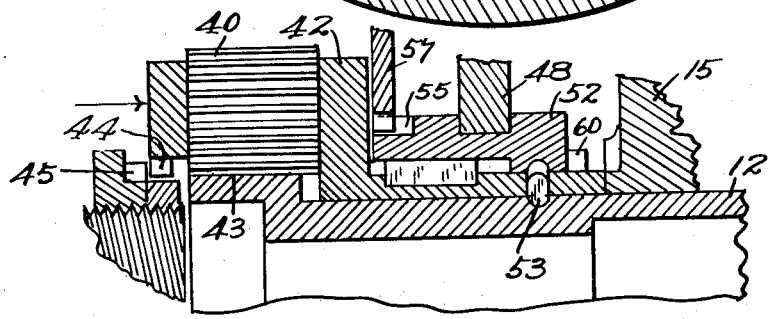
Figures 3 and 4 show different positions of the clutch controller.

When the runner 42 and the controller 52 are shifted as one, to free wheeling position, Fig. 3, the tumblers 53 extend into the raceway 54 and disengage from the controller, and the lever latch 51 takes into the second notch 50. Drive is now from coupler 34 through planets 40, runner 42 to shaft 12, the controller 52 and the runner 42 being locked at 57—55 (Fig. 3). Since the runner 42 is now free from lock 45, the driven coupler 34 can slip or free-wheel as to the driving clutch 30.

Figure 4:
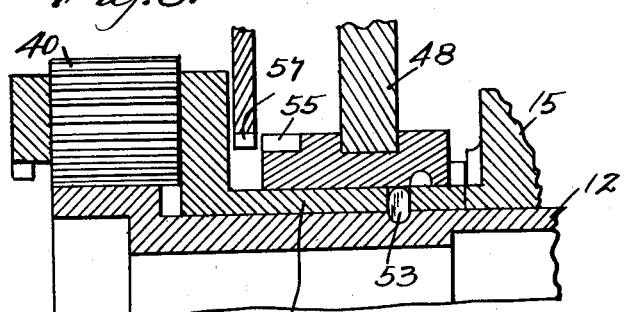

In free wheeling position of parts, the runner 42 has taken up clearance 46 and is stopped from further outward shifting with the controller 52. The controller can still be shifted on the runner 42 so as to disengage the gear teeth 55 from gear-ring 57 so as to bring the transmission assembly to neutral Fig. 4, and allow the motor to idle free from the drive train. When so shifted, the lever latch 51 takes into the third notch 50 on the yoke bearing 49. In neutral position, the ring gear 57 is running free between the head of the runner 42 and the end of the wide gear teeth 55 of the controller, Fig. 4, and the coupler and the planets roll around the sun gear 43.

Provision is also made for a reverse drive of the driven shaft 12. To this purpose the controller 52 has a set of dog teeth 60 which are adapted to positively engage complementary teeth 61 on a fixed part, as of the gear box and lock the runner 42. When the yoke 48 is shifted to bring the reverse-effect teeth 60—61 together, the latch 51 takes into the fourth notch 50. Drive is now through the coupler 34, planets 40 spinning as to the coupler and reverse driving the sun shaft 12.

In all shifting actions of the runner 42, the planetary gears 40 shift along the length of the internal driving gear 38, and of the sun gear 43 of the driven shaft 12. The runner is shiftable only from positive drive position, Fig. 1, one step to free wheeling position Fig. 3, and vice versa, but the controller is further movable two more steps; to neutral and to reverse; while the runner is at shift limit.

A brake means may be applied to hold a part of the transmission if desired, and as here shown, the coupler flange 37 is provided with a system of rollers 65 to be engaged by an outer system of pistons 66 mounted for radial movement in a cylindrical cage 67 which is fastened in the box. These pistons are pressed inwardly by a pliable wall-diaphragm 68 lining a cage jacket 69 which clamps the lining hermetically in place. To effect application of the brake to the coupler flange rollers 65, fluid under pressure is transmitted by a conduit 70 to the jacket whence it accumulates on the diaphragm and this forces the pistons 66 in on the rollers with holding effect.

Normal driving position of the transmission is shown in Fig. 3, with the positive drive lugs 44—45 out of mesh so that if the load on part 12 exceeds the set throttle power delivered to coupler 34 this can slow down free of the clutch drive 30 thus effecting an automatic relative increase in the speed of the driver 30 as to the driven part 34. This automatic relative change of speed increases the torque of the drivers 30 to carry the load at a lower speed, without throttle change.

In position for reverse drive, the clutch also allows free-wheeling.

What is claimed is:

1. In a transmission mechanism, a driving shaft, a sleeve on said shaft, a helical drive connection between said shaft and the sleeve, a piston head on the sleeve, and a fluid chamber in which the head works and which is splined to the sleeve for rotation therewith and for relative reciprocation.

2. A transmission part including a fluid-pressure actuated clutch device, a drive shaft, and means connecting said part and said shaft for joint rotation and which is operative by the shaft to create fluid pressure in the clutch device.

3. In a transmission mechanism, a fluid-pressure controlled clutch device, a drive means for said device and including a fluid-pressure generator therefor, and means adapted to be driven by said clutch device and having a free-wheeling relation therewith, and including means for effecting a positive connection with the drive means.

4. In a transmission mechanism, a fluid-pressure controlled clutch device, a drive means for said device and including a fluid-pressure generator therefor, and means adapted to be driven by said clutch device and having a free-wheeling relation therewith, and means for effecting a neutral relation of the clutch and the driven means.

5. In a transmission mechanism, a fluid-pressure controlled clutch device, a drive means for said device and including a fluid-pressure generator therefor, and means adapted to be driven by said clutch device and having a free-wheeling relation therewith, and including means for effecting a positive connection with the drive means, means for effecting a neutral relation of the clutch and the driven means, and means to reverse direction of rotation of the driven means as to the driving clutch.

6. In a transmission mechanism, a drive part, a fluid-pressure controlled clutch device operated thereby, a free-wheeling driven means on which the clutch is operative, and a controller operative to positively interconnect said clutch and the drive part, or to bring them to neutral, or to effect a reverse drive of the said means.

7. In a fluid-pressure clutch device, a driven part having a cylindrical system of peripheral, free rollers, a cage provided with a cylindrical system of free piston bars, and a pliable diaphragm lining the system of bars and operative thereby to embrace the correlative system of rollers to rotate the system carrying part.

JOHN C. MESSICK.